USO08909816B2

(12) United States Patent
Gonen et al.

(10) Patent No.: US 8,909,816 B2
(45) Date of Patent: Dec. 9, 2014

(54) IMPLEMENTING A LOGICAL UNIT RESET COMMAND IN A DISTRIBUTED STORAGE SYSTEM

(75) Inventors: Smadar Gonen, Tel Aviv (IL); Benny Koren, Zichron Yakov (IL); Eran Mann, Yoqneam (IL); Eyal Gordon, Haifa (IL); Doron Tal, Haifa (IL); Ido Benda, Misgav (IL)

(73) Assignee: Kaminario Technologies Ltd., Yokne'am Ilit (IL)

( * ) Notice: Subject to any disclaimer, the term of this patent is extended or adjusted under 35 U.S.C. 154(b) by 286 days.

(21) Appl. No.: 13/423,549

(22) Filed: Mar. 19, 2012

(65) Prior Publication Data
US 2013/0246660 A1   Sep. 19, 2013

(51) Int. Cl.
G06F 3/00 (2006.01)
G06F 11/07 (2006.01)

(52) U.S. Cl.
CPC ........ G06F 11/0727 (2013.01); G06F 11/0751 (2013.01)
USPC ........................................ 710/5; 710/6; 710/7

(58) Field of Classification Search
CPC ............ G06F 11/0727; G06F 11/0751; G06F 11/2089; G06F 11/1658; G06F 11/2092
See application file for complete search history.

(56) References Cited

U.S. PATENT DOCUMENTS

| 4,590,554 | A  | * | 5/1986 | Glazer et al. | 714/13 |
| 5,845,154 | A  | * | 12/1998 | Krakirian | 710/74 |
| 6,694,450 | B1 | * | 2/2004 | Kidder et al. | 714/15 |
| 6,772,231 | B2 | * | 8/2004 | Reuter et al. | 710/8 |
| 6,959,344 | B2 | * | 10/2005 | Murotani et al. | 710/15 |
| 7,240,364 | B1 | * | 7/2007 | Branscomb et al. | 726/9 |
| 7,280,529 | B1 | * | 10/2007 | Black et al. | 370/352 |
| 7,349,960 | B1 | * | 3/2008 | Pothier et al. | 709/224 |
| 7,720,928 | B2 | * | 5/2010 | Reuter et al. | 709/213 |
| 7,861,031 | B2 | * | 12/2010 | Feather et al. | 711/111 |
| 8,108,644 | B2 | * | 1/2012 | Innan et al. | 711/170 |
| 8,392,668 | B2 | * | 3/2013 | Reuter | 711/154 |
| 2002/0019863 | A1 | * | 2/2002 | Reuter et al. | 709/221 |
| 2003/0126195 | A1 | * | 7/2003 | Reynolds et al. | 709/203 |
| 2004/0221070 | A1 | * | 11/2004 | Ortega et al. | 710/5 |
| 2005/0055468 | A1 | * | 3/2005 | Reuter et al. | 710/1 |
| 2005/0149637 | A1 | * | 7/2005 | Fox et al. | 710/5 |
| 2006/0206494 | A1 | * | 9/2006 | Ibrahim et al. | 707/10 |
| 2007/0005819 | A1 | * | 1/2007 | Skirvin et al. | 710/8 |
| 2007/0165660 | A1 | * | 7/2007 | Fang et al. | 370/410 |
| 2010/0030992 | A1 | * | 2/2010 | Fienblit et al. | 711/166 |
| 2010/0115143 | A1 | * | 5/2010 | Nakajima | 710/5 |
| 2011/0276831 | A1 | * | 11/2011 | Perelstein et al. | 714/37 |
| 2012/0117347 | A1 | * | 5/2012 | Fienblit et al. | 711/162 |
| 2013/0205108 | A1 | * | 8/2013 | Perelstein et al. | 711/162 |

* cited by examiner

Primary Examiner — Henry Tsai
Assistant Examiner — Jing-Yih Shyu
(74) Attorney, Agent, or Firm — Wiggin and Dana LLP; Gregory S. Rosenblatt; Robert J. Kasten

(57) ABSTRACT

A method of implementing a logical unit reset across a plurality of interfaces in a distributed storage system, comprising: initiating a session for implementing the logical unit reset across the plurality of interfaces in response to receiving at a central controller a logical unit reset command from an originator interface, and writing session-data including an indication that the originator interface implemented the respective logical unit reset locally; communicating a logical unit reset command from the central controller to each interface other than the originator interface; updating the session data in response to receiving an indication from an interface that the logical unit was successfully reset locally and when each one of the plurality of interfaces implemented the logical unit reset locally, communicating a success response to each one of the plurality of interfaces.

20 Claims, 6 Drawing Sheets

Interface Logical Unit Reset Command Session Data

| Command ID | Logical Unit ID | Is Complete Locally | Is Complete in the System | Source of LUR Command |
|---|---|---|---|---|
| 23 | 7 | True | False | Initiator |
| ... | ... | ... | ... | ... |
| 45 | 12 | True | False | Central Controller |

FIG. 3A

Central Controller Logical Unit Reset Commands Session Data

| Logical Unit No. | Expected IF Completions | Actual IF Completed | Request Waiting for Completion Notification |
|---|---|---|---|
| 7 | I_1, ..., I_N | I_1, ..., I_N-1 | I_1:23, I_2:54, ..., I_N-1:12 |
| ... | ... | ... | ... |
| 12 | I_1, ..., I_N | I_1 | I_1:45 |

FIG. 3B

IMPLEMENTING A LOGICAL UNIT RESET COMMAND IN A DISTRIBUTED STORAGE SYSTEM

FIELD

The present disclosure is in the field of distributed storage systems and relates to implementing a logical unit reset command across multiple functional entities of a distributed storage system.

BACKGROUND

Logical unit reset is a command which may be issued by a host towards a storage target logical unit. Typically a storage system that is configured to implement a logical unit reset, is responsive to a storage unit reset command for aborting all ongoing tasks, and returning the logical unit to an initial state, similar to a device power-on.

SUMMARY

Many of the functional components of the presently disclosed subject matter can be implemented in various forms, for example, as hardware circuits comprising custom VLSI circuits or gate arrays, or the like, as programmable hardware devices such as FPGAs or the like, or as a software program code stored on an intangible computer readable medium and executable by various processors, and any combination thereof. A specific component of the presently disclosed subject matter can be formed by one particular segment of software code, or by a plurality of segments, which can be joined together and collectively act or behave according to the presently disclosed limitations attributed to the respective component. For example, the component can be distributed over several code segments such as objects, procedures, and functions, and can originate from several programs or program files which operate in conjunction to provide the presently disclosed component.

In a similar manner, a presently disclosed component(s) can be embodied in operational data or operational data can be used by a presently disclosed component(s). By way of example, such operational data can be stored on a tangible computer readable medium. The operational data can be a single data set, or can be an aggregation of data stored at different locations, on different network nodes or on different storage devices.

The method or apparatus according to the subject matter of the present application can have features of different aspects described above or below, or their equivalents, in any combination thereof, which can also be combined with any feature or features of the method or apparatus described in the Detailed Description presented below, or their equivalents.

According to an aspect of the presently disclosed subject matter, there is provided a method of implementing a logical unit reset across a plurality of interfaces in a distributed storage system. According to examples of the presently disclosed subject matter, the method of implementing a logical unit reset across a plurality of interfaces in a distributed storage system can include: in response to receiving at a central controller a logical unit reset command from an originator interface, initiating a session for implementing the logical unit reset across the plurality of interfaces, and writing session-data including an indication that the originator interface implemented the respective logical unit reset locally; communicating a logical unit reset command from the central controller to each interface other than the originator interface; updating the session-data in response to receiving an indication from an interface that the logical unit was successfully reset locally; and when each one of the plurality of interfaces has implemented the logical unit reset locally, communicating a success response to each one of the plurality of interfaces.

According to examples of the presently disclosed subject matter, the method can further include: in response to receiving at an originator interface a logical unit reset command from an external initiator, locally resetting the logical unit on the originator interface and communicating the logical unit reset command to the central controller.

In still further examples of the presently disclosed subject matter, the method can further include: in response to receiving at the originator interface the success response from the central controller, communicating a success response from the originator interface to the external initiator.

In further examples of the presently disclosed subject matter, the method can also include: in response to receiving a central controller failure indication, requesting each one of the plurality of interfaces to provide data with respect to pending logical unit reset commands; in response to receiving a pending logical unit reset command response from an interface, initiating on a backup controller a session for implementing the logical unit reset across the plurality of interfaces; writing session-data including an indication that interfaces which reported having a pending logical unit reset implemented the respective logical unit reset locally; communicating a logical unit reset command from the backup controller to each one of the plurality of interfaces which did not report having a pending logical unit reset command with respect to the logical unit; and in response to receiving a success response from each one of the plurality of interfaces indicating that the logical unit was locally reset, communicating a success response to each one of the plurality of interfaces.

In still further examples of the presently disclosed subject matter, the method can include: in case an interface from among the plurality of interfaces is not responsive to the logical unit reset command from the central controller, removing it from a list of active interfaces.

According to examples of the presently disclosed subject matter, in case the logical unit reset command is received at the central controller while the central controller has an active session for implementing resetting of the same logical unit as the one referenced in the command, updating the active session with an indication that that the originator interface implemented the respective logical unit reset locally.

According to further examples of the presently disclosed subject matter, in response to receiving the success response from the central controller at each one of the plurality of originator interfaces, communicating a success response from the respective originator interface to an external initiator from which the logical unit reset command was received at the originator interface.

According to a further aspect of the presently disclosed subject matter, there is provided a distributed storage system. According to examples of the presently disclosed subject matter, the distributed storage system can include a plurality of interfaces, including an originator interface which received a logical unit reset command from an initiator and a central controller. The central controller can be responsive to receiving a logical unit reset command from the originator interface for: initiating a session for implementing the logical unit reset across the plurality of interfaces, writing session-data including an indication that the originator interface implemented the respective logical unit reset locally, and communicating a logical unit reset command to each interface other than the originator interface. The central controller can be configured to update the session-data in response to receiving an indication from an interface that the logical unit was successfully reset locally. The central controller is configured to communicate a success response to each one of the plurality of interfaces when each one of the plurality of interfaces successfully implemented the logical unit reset locally.

According to examples of the presently disclosed subject matter, the originator interface can be responsive to receiving the logical unit reset command from an external initiator for locally resetting the logical unit on the originator interface and communicating the logical unit reset command to the central controller.

According to examples of the presently disclosed subject matter, the originator interface is responsive to receiving the success response from the central controller for communicating a success response to the external initiator.

According to examples of the presently disclosed subject matter, the system can further include a backup controller. The backup controller can be responsive to receiving an indication that the central controller failed to request each one of the plurality of interfaces to provide data with respect to pending logical unit reset commands. The backup controller can be responsive to receiving a pending logical unit reset response from an interface for: initiating a session for implementing the logical unit reset across the plurality of interfaces; writing session-data including an indication that interfaces which reported having a pending logical unit reset implemented the respective logical unit reset locally; communicating a logical unit reset command from the backup controller to each one of the plurality of interfaces which did not report having a pending logical unit reset command with respect to the logical unit; and in response to receiving a success response from each one of the plurality of interfaces indicating that the logical unit was locally reset, the backup controller can be configured to communicate a success response to each one of the plurality of interfaces.

According to further examples of the presently disclosed subject matter, the central controller can be configured to maintain a list of active interface services, and can be further configured to remove an interface from the list in case the interface is not responsive to the logical unit reset command from the central controller.

According to examples of the presently disclosed subject matter, in case the logical unit reset command is received at the central controller while the central controller has an active session for implementing resetting of the same logical unit as the one referenced in the command, the central controller can be configured to update the active session with an indication that the originator interface implemented the respective logical unit reset locally.

According to examples of the presently disclosed subject matter, the session-data can identify a plurality of originator interfaces, wherein each one of the plurality of originator interfaces is associated with a different logical unit reset command that relates to the same logical unit.

According to examples of the presently disclosed subject matter, in response to receiving the success response from the central controller at each one of the plurality of originator interfaces, each one of the originator interfaces can be configured to communicate a success response to an external initiator from which the logical unit reset command was received at the originator interface.

According to a further aspect of the examples of the presently disclosed subject matter, there is provided a central controller of a distributed storage system that is configured to enable implementing a logical unit reset across a plurality of interfaces in the distributed storage system. The central controller can include a processor and a communication module. The processor can be responsive to receiving a logical unit reset command from an originator interface for: initiating a session for implementing the logical unit reset across the plurality of interfaces, and writing session-data including an indication that the originator interface implemented the respective logical unit reset locally. The communication module can be configured to communicate a logical unit reset command to each interface other than the originator interface. The processor can be further configured to update the session-data in response to receiving an indication from an interface that the logical unit was successfully reset locally. The processor can be configured to issue a success response to each one of the plurality of interfaces when each one of the plurality of interfaces successfully implemented the logical unit reset locally.

According to yet a further aspect of the presently disclosed subject matter there is provided a program storage device readable by machine, tangibly embodying a program of instructions executable by the machine to perform the method of implementing a logical unit reset across a plurality of interfaces in a distributed storage system according to examples of the presently disclosed subject matter.

In yet a further aspect of the presently disclosed subject matter, there is provided a computer program product comprising a computer useable medium having computer readable program code embodied therein of implementing a logical unit reset across a plurality of interfaces in a distributed storage system. The computer program product can include computer readable program code for implementing the method according to examples of the presently disclosed subject matter.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 3A is a graphical illustration of session-data that can be kept on an interface of the storage system with respect to pending logical unit reset commands, according to examples of the presently disclosed subject matter;

FIG. 3B is a graphical illustration of session-data that can be kept on the central controller, with respect to pending logical unit reset commands, according to examples of the presently disclosed subject matter;

Figure 1:
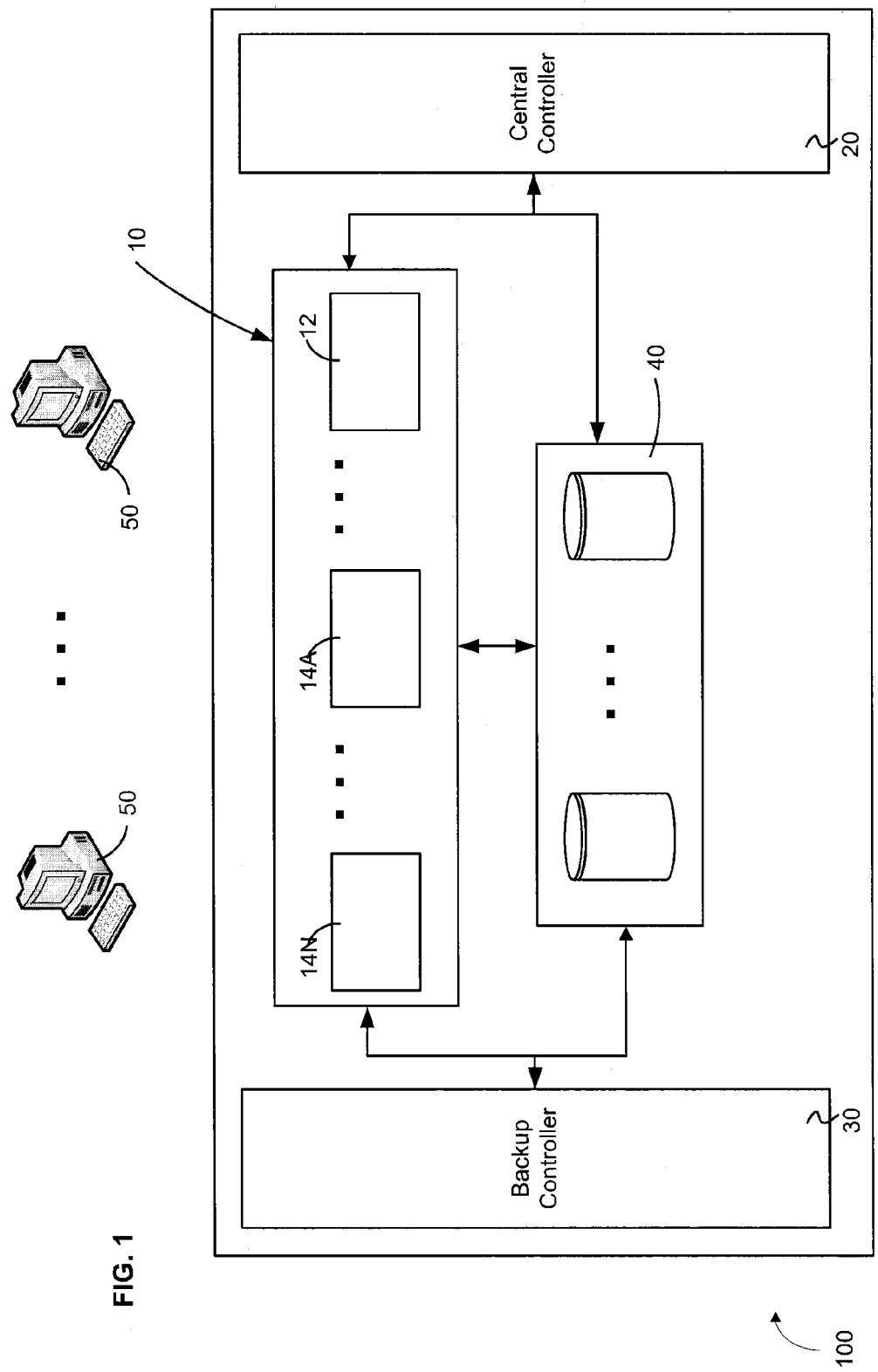
FIG. 1 is a block diagram of a distributed storage system that is configured to implement a logical unit reset across a plurality of interfaces.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures and components have not been described in detail so as not to obscure the presently disclosed subject matter.

Unless specifically stated otherwise, as apparent from the following discussions, it is appreciated that throughout the specification discussions various functional terms refer to the action and/or processes of a computer or computing device, or similar electronic computing device, that manipulate and/or transform data represented as physical, such as electronic, quantities within the computing device's registers and/or memories into other data similarly represented as physical quantities within the computing device's memories, registers or other such tangible information storage, transmission or display devices.

Examples of the presently disclosed subject matter relate to a method of implementing a logical unit reset across a plurality of interfaces in a distributed storage system, and to a storage system that consists of a plurality of interfaces and a common storage resource and which is configured for implementing the method of implementing a logical unit reset across the plurality of interfaces.

According to examples of the presently disclosed subject matter the method of implementing a logical unit reset across a plurality of interfaces in a distributed storage system can include: in response to receiving at a central controller a logical unit reset command from an originator interface, initiating on the central controller a session for resetting of a logical unit referenced in the command, and writing session-data identifying the originator interface; communicating a logical unit reset command from the central controller to each one of the plurality of interfaces other than the originator interface; and in response to receiving a success response from the plurality of interfaces other than the originator interface indicating that the logical unit was locally reset, communicating a success response to each one of the plurality of interfaces indicating a completion of the logical unit reset.

Throughout the description and the claims, reference is made to the term "interface". The term interface is known in the art of digital storage, and the following definition is provided as a non-limiting example only for convenience purposes. Accordingly, interpretation of the term interface in the claims, unless stated otherwise, is not limited to the definitions below and the term interface should be given its broadest reasonable interpretation. The term interface as used herein relates to an entity in a storage system which accepts commands from initiators, initiates the processing of the commands processing within the storage system, and upon completion of the commands within the storage system, the interface sends a response back to the initiators.

Throughout the description and the claims, reference is made to the term "logical unit". The term logical unit is known in the art of digital storage, and the following definition is provided as a non-limiting example only for convenience purposes. Accordingly, interpretation of the term logical unit in the claims, unless stated otherwise, is not limited to the definitions below and the term logical unit should be given its broadest reasonable interpretation. The term logical unit as used herein relates to a logical abstraction of a storage area. A logical unit is typically part of a logical addressing scheme and is used to address data within the storage system and externally (e.g., vis-á-vis hosts). Each logical unit can be associated with a plurality of logical block addresses. In some storage systems, the combination of a given logical unit with a given logical block address constitutes the most basic addressable segment in the logical domain. In examples of the presently disclosed subject matter, a logical unit can be the fundamental unit in the logical domain that is managed as a discrete virtual storage device. According to examples of the presently disclosed subject matter, a logical unit can consist of a plurality of addressable logical storage addresses. Further by way of example, each one of the storage addresses which are part of a given logical unit can be referenced in a I/O command that is addressed to the storage system, either alone or as part of a range of logical storage addresses. For example in the SCSI protocol I/O commands can reference a specific LU (a logical unit) and can also reference specific LBAs (or blocks) or LBA ranges within a specific LU. A logical unit reset command typically relates to the entire logical unit (e.g., a given LU) including all of the logical blocks (e.g., LBAs) which are part of the logical unit.

Throughout the description and the claims, reference is made to the term "logical unit reset command". The term logical unit reset command is known in the art of digital storage, and the following definition is provided as a non-limiting example only for convenience purposes. Accordingly, interpretation of the term logical unit reset command in the claims, unless stated otherwise, is not limited to the definitions below and the term logical unit reset command should be given its broadest reasonable interpretation. The term logical unit reset command as used herein relates to a command which may be issued by a host towards a target storage logical unit for causing the storage system to reset the logical unit. The storage system can be configured to implement certain actions upon receiving the logical unit reset command, including, but not limited to: aborting all ongoing tasks of the logical unit within the storage system, and returning the logical unit to an initial state (similar to its power-on state). For example, the SCSI protocol supports a logical unit reset command. However it should be noted, that some examples of the presently disclosed subject matter are not limited to the aforementioned protocols/standards and the logical unit reset command can be implemented in the system irrespective of such protocols.

According to examples of the presently disclosed subject matter, a logical unit reset command is initially received in the storage system by an originator interface. The logical unit reset command can arrive at the originator interface from an external entity (e.g., a host) or from within the storage system (e.g., from a central controller). As used herein the term "originator interface", relates to the interface (of a storage system) which initially received the logical unit reset command. It would be appreciated that in some storage systems, and in particular in mass storage systems, a plurality of interfaces can be used for interfacing with hosts (and possibly with other external entities) or for providing interface services to internal entities. Accordingly, when a logical unit reset command, e.g., from a host, is received at a storage system that includes multiple interfaces, the interface through which the logical unit reset command is initially received is the originator interface for this logical unit reset command.

According to examples of the presently disclosed subject matter, the source of the logical unit reset command can be within the storage system, for example, the central controller can issue a logical unit reset command, either directly to one of the interfaces or through a proxy. It would be appreciated, that in such circumstances (i.e., when the source of the logical unit reset command is within the system), it may be necessary to implement the logical unit reset command across the plurality of interfaces, and possibly also to implement failover and/or provisions supporting continued availability in case of failure, and so, in such examples of the presently disclosed subject matter, the logical unit reset command from the source within the storage system can be fed to one of the plurality of interfaces, and that interface is configured to operate as the originator interface.

Reference is now made to FIG. 1, which is a block diagram of a distributed storage system that is configured to implement a logical unit reset across a plurality of interfaces. A storage system 100 according to examples of the presently disclosed subject matter can include multiple interfaces 10, a central controller 20, a backup controller 30, and physical storage resources 40. The storage system 100 can be operatively connected to external entities, such as hosts 50.

According to examples of the presently disclosed subject matter, the hosts 50 can issue commands to the storage system 100, including logical unit reset commands which are supported by the system 100. For example, the storage system 100 can support SCSI commands including the logical unit reset command. The multiple interfaces 10 are utilized by the storage system 100 for receiving incoming communications, including logical unit reset commands. Thus, when a host 50 issues a logical unit reset command, the command is received in the storage system 100 by one of the multiple interfaces 10. The interface which received the incoming logical unit reset command is referred to as the originator interface 12.

The details concerning the process that is used to determine which interface from amongst the multiple interfaces 10 is to receive a particular communication from a host 50 are known to those versed in the art and are beyond the scope of the present disclosure. For convenience it is assumed that the interface through which a logical unit reset command is received in the storage system 100 is also the originator of the logical unit reset command within the storage system 100. For convenience, the originator interface is marked in FIG. 1 with the numeral 12, while the other interfaces are marked in FIG. 1 as elements 14A-14N. According to examples of the presently disclosed subject matter, interfaces 14A-14N can include any number of interfaces from one and above (e.g., one, two, three, etc.). It would be appreciated that for each (or for some) incoming communication from a host, an interface from amongst the plurality of interfaces is designated as an originator, and, for different communications, different interfaces can act as originators.

As mentioned above, in further examples of the presently disclosed subject matter, the source of the logical unit reset command can be within the storage system 100, and the logical unit reset command can be fed (possibly via a proxy) to one of the interfaces, which will serve an originator interface, and the logical unit reset command shall be processed in a manner that is substantially identical to the processing of a logical unit reset command arriving from an external entity.

According to examples of the presently disclosed subject matter, the interfaces 10 implement a logical addressing scheme which is a logical abstraction over the storage resources 40 that are allocated by a storage layer. The storage layer is presented in FIG. 1, by way of non-limiting example, as an array of physical storage devices. The storage resources 40 are allocated by the array of storage devices. It would be appreciated that each one of the interfaces 10 can be operatively connected to each one of the storage devices and vice-versa. The storage system 100 can store data on the storage device, and the data stored on the storage devices can be retrieved. Each one of the storage devices can provision multiple physical storage addresses, and logical storage addresses can be mapped to the physical storage locations provisioned by the storage devices. It would be appreciated that the storage devices underlying the physical storage layer can be of any type, including, but not limited to hard drive disks, solid state disks, volatile memory storage units, etc. Furthermore, it would be appreciated that various physical storage resources allocation schemes can be implemented in the storage system 100, such as various RAID schemes, etc.

According to examples of the presently disclosed subject matter, commands, such as the logical unit reset command, can reference a particular logical unit to which they relate. Mapping tables can be used to translate the corresponding logical addresses to respective physical storage locations. In other examples, the operations associated with a logical unit reset command can be performed at the logical layer, and with respect to the logical unit referenced in the I/O command, possibly, without affecting the physical storage layer.

According to examples of the presently disclosed subject matter, the logical unit reset command can involve, for example, a storage interface aborting all of the I/O operations that it received from an initiator which the interface started processing, as well as clearing any state that the interface is maintaining pertaining to the logical unit. Accordingly, in a distributed storage system that includes a plurality of interfaces that are each used for servicing a given logical unit, and are each carrying out logical unit management operations with respect to the logical unit, servicing a logical unit reset command may require implementing the logical unit reset command on each one of the active storage interfaces.

According to examples of the presently disclosed subject matter, each one of the interfaces 10 is operatively connected to the central controller 20. The central controller 20 can be configured to control and synchronize certain operations and/or data on each or on some of the plurality of interfaces 10. It would be appreciated that the central controller 20 can be adapted to control other operations within the storage system 100 which can involve other components thereof. In further examples, the central controller 20 can be adapted to invoke a certain operation across a plurality of interfaces in response to data received or otherwise obtained from one of the interfaces.

According to examples of the presently disclosed subject matter, the backup controller 30 can provide a backup for the central controller 20, and in case the central controller 20 fails, the backup controller 30 can implement a restore routine, which shall be described below, and once the restore routine completes (or concurrently with the implementation of the restore routine), the backup controller 30 can be configured to replace the failed central controller (and become the new central controller). In some examples of the presently disclosed subject matter, during normal operation of the central controller 20, the backup controller 30 can be kept in a standby mode. Further by way of example, while in the standby mode the backup controller 30 does not receive any updates from the central controller with regard to implementation(s) of logical unit reset commands.

According to examples of the presently disclosed subject matter, the storage system 100 is configured to enable high-performance implementation of a logical unit reset command across the plurality of interfaces 10. In further examples of the presently disclosed subject matter, the central controller 20 can be configured to use non-persistent session-data to support a process of implementing a logical unit reset command across a plurality of interfaces, e.g., interfaces 14A-14N. In this regard, it would be appreciated that using non-persistent session-data can be advantageous in terms of performance (e.g., access speed, write speed, etc.).

In yet further examples of the presently disclosed subject matter, the storage system 100 can be configured to enable a process of implementing a logical unit reset command across the plurality of interfaces 10 in a manner that is characterized by high availability, at least in the sense that the logical unit reset command implementation process can be restored in case of failure of the central controller 20. In still further examples of the presently disclosed subject matter, the storage system 100 can be configured such that while the central controller 20 is functioning properly (it has not failed), the high availability support does not significantly affect the storage system's 100 performance in connection with implementing the logical unit reset command across the plurality of interfaces 10. In particular, in some examples of the presently disclosed subject matter, the storage system 100 can be configured to recover from a failure of the central controller 20 during the servicing of a pending logical unit reset command, as will be further described below. As will also be described below, in some examples of the presently disclosed subject matter, the ability to recover from a failure of the central controller 20 is efficient in the sense that it does not require a time consuming backup process, or persistent storage of session backup data.

According to examples of the presently disclosed subject matter, the storage system 100 can be configured to utilize a backup controller 30 that is configured to implement a recovery process which uses session-data from the plurality of interfaces 10 to recover from a failure of the central controller 20. The recovery process according to examples of the presently disclosed subject matter, can allow the storage system 100 to service logical unit reset commands that were pending when the central controller 20 failed, thus overcoming the loss of the session-data that was stored on the failed central controller 20, despite not having a time consuming backup process, or persistent storage of session backup data.

Figure 2:
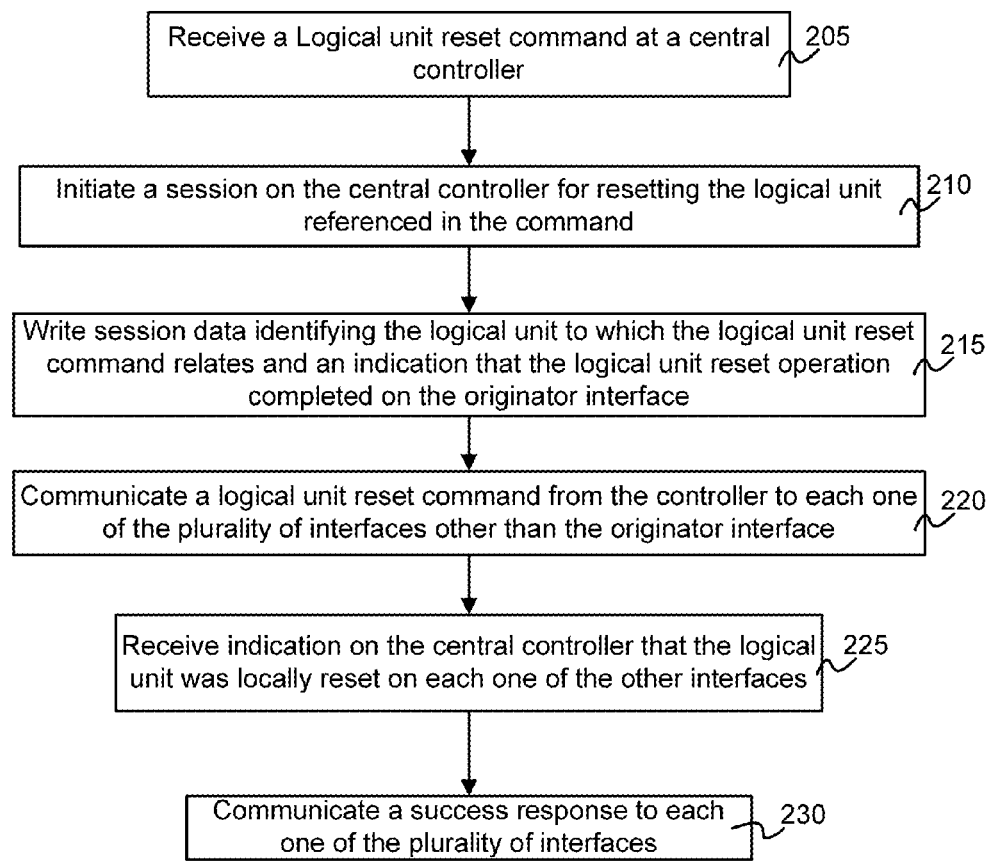
FIG. 2 is a flowchart illustration of a method of implementing a logical unit reset across a plurality of interfaces in a distributed storage system, according to examples of the presently disclosed subject matter.

Reference is now additionally made to FIG. 2, which is a flowchart illustration of a method of implementing a logical unit reset across a plurality of interfaces in a distributed storage system, according to examples of the presently disclosed subject matter. According to non-limiting examples of the presently disclosed subject matter, the method of implementing a logical unit reset across a plurality of interfaces in a distributed storage can be implemented by the storage system 100 shown in FIG. 1 and described above. However, the methods described herein are not necessarily limited to being implemented by this system and can be implemented by other suitable systems.

According to examples of the presently disclosed subject matter, at some point, a logical unit reset command is received at a central controller 20 of the storage system 100 (block 205). In examples of the presently disclosed subject matter, the logical unit reset command is received at the central controller 20 from an originator interface 12, which as mentioned above, is the interface which initially received the logical unit reset command. The source of the reset command can be an external host 50, or the source can be the storage system itself 100 (or some component of the storage system 100).

According to examples of the presently disclosed subject matter, each logical unit reset command that is received at the central controller 20 can include: an identifier of the logical unit (or any other specified storage resource) to which the command relates, and an identifier of the command. The identifier of the logical unit reset command may be a number, or some other form of information, which is assigned to a logical unit reset command by an interface. The interfaces can include logic that can be utilized for and that is configured to enable generating an identifier for each logical unit reset command. The identifier can be unique within the scope of the interface. According to examples of the presently disclosed subject matter, the identifier can be used for uniquely referencing an instance of a logical unit reset command which is active in the interface. In some examples of the presently disclosed subject matter, the identifier of the command type can be a unique identifier that is a combination of a (unique) ID of the interface from which the logical unit reset command was received with a command ID. The command ID can be the locally unique ID that was generated (or otherwise obtained) by the originator interface 12 from which the logical unit reset command was received at the central controller 20. As will be further explained below, for a given logical unit reset command from the storage system 100, a command ID can be generated in each interface which is participating in the process of implementing a logical unit reset command across a plurality of interfaces, i.e. for a given logical unit reset command in the storage system 100, a command ID can be generated in the originator interface 12, as well as in each of the plurality of interfaces 14A-14N other than the originator interface 12. On each interface 10, the command ID can be locally unique (it is unique in this particular interface), and different interfaces can generate different command IDs for the same logical unit reset command in the system 100.

For example, referring now to FIG. 3A, which is a graphical illustration of session-data that can be kept on an interface of the storage system with respect to pending logical unit reset commands, according to examples of the presently disclosed subject matter, for each pending logical unit reset command, the interface can hold in a table (FIG. 3A) a locally unique ID (column 302), an identifier of the logical unit to which the logical unit reset command relates (column 306), and the source of the logical unit reset command (column 308). According to examples of the presently disclosed subject matter, columns 322 and 324 are optional and shall be described below. Thus for example, the logical unit reset command associated with the local ID "23" is associated with the logical unit whose ID is "7", and this logical unit reset command was received from an external initiator (say a host 50). The term pending logical unit reset command is further discussed below.

Further referring to FIG. 3B, which is a graphical illustration of session-data that can be kept on the central controller, with respect to pending logical unit reset commands, according to examples of the presently disclosed subject matter, the session-data which the central controller 20 is configured to hold in a table (FIG. 3B) for each pending logical unit reset command can include: the identifier of the logical unit to which the respective logical unit reset command relates (column 312), a list of the interfaces from which a message was received indicating successful completion of a local logical unit reset operation (column 314), and a list of interfaces that are awaiting a completion notification from the controller (column 316). The data in columns 314 and 316 and its significance in examples of the presently disclosed subject matter will be further discussed below.

As mentioned above, according to examples of the presently disclosed subject matter, the session-data that is kept by the central controller 20 for a given logical unit can include an identifier of the logical unit and an identifier of the logical unit reset command or commands that are currently being serviced by the central controller 20.

With reference to an example that is illustrated in FIGS. 3A and 3B, the initial logical unit reset command can be received at the interface whose ID is "I__1" (FIG. 3A), and can be identified on I__1 as logical unit reset command "23". The interface I__1 which is in this example the originator interface 12 issues a logical unit reset command to the central controller 20. The logical unit reset command from I__1 includes a unique identifier of the logical unit reset command, which by way of example is a combination of the identifier of the interface and the locally unique identifier of the respective logical unit reset command on I__1, thus in this example the logical unit reset command from I__1 includes the unique identifier "I__1:23". In addition, the logical unit reset command from I__1 includes the ID of the logical unit to which the logical unit reset command relates, in this case "7".

It would be appreciated that the session-data on the interfaces 10 and on the central controller 20 can be maintained in other forms than those illustrated in FIGS. 3A and 3B, respectively. For example, the session-data on either of the interfaces 10 and the central controller 20 is not necessarily organized in a table. Furthermore, the central controller 20 can allocate different memory areas for different sessions, and session-data that is associated with different sessions can be stored in different memory areas.

Returning now to the description of FIG. 2, according to examples of the presently disclosed subject matter, the central controller 20 can be responsive to receiving the logical unit reset command for initiating a session for resetting the logical unit referenced in the command (block 210).

In some examples of the presently disclosed subject matter, when the central controller 20 receives a logical unit reset command from an interface, the central controller 20 is first configured to determine to which logical unit the command relates, and if there is already an ongoing session for resetting the logical unit referenced in the command, the central controller 20 is configured to add the logical unit reset command to the active session. According to examples of the presently disclosed subject matter, adding a logical unit reset command to an active session can involve adding appropriate session-data to the active session, as will be described below. Thus, according to examples of the presently disclosed subject matter, the central controller 20 can be configured to initiate a new session in response to an incoming logical unit reset command from one of the interfaces, only when there is not already an active session for the same logical unit referenced in the logical unit reset command.

According to examples of the presently disclosed subject matter, as part of initiating a session, the central controller 20 can be configured to allocate memory resources for session-data and can write session-data to the allocated memory. It would be appreciated that the memory allocation can be dynamic. According to examples of the presently disclosed subject matter, upon (or immediately following) the initiation of the session, the central controller 20 can be adapted to write session-data which identifies the logical unit to which the logical unit reset command relates, and further to write data indicating the completion of the local logical unit reset operation on the originator interface 12 (block 215). In this regard, it would be appreciated that, according to examples of the presently disclosed subject matter, the originator interface 12 can be configured to locally reset the logical unit to which the reset command relates before (or substantially concurrently with) communicating the logical unit reset command to the central controller 20, and once the logical unit reset command from the originator interface 12 is received at the central controller 20, the central controller 20 can be configured to write in the corresponding session-data an indication that the originator interface 12 completed the logical unit reset operation. According to examples of the presently disclosed subject matter, the central controller 20 does have an indication regarding which interface is the originator interface 12. In still further examples of the presently disclosed subject matter, the process implementing a logical unit reset across a plurality of interfaces does not necessitate that the central controller have knowledge about which one of the interface(s) is an originator for a given logical unit reset command. In still further examples of the presently disclosed subject matter, a recovery process (that shall be described below), which can be carried out in case the central controller fails, in order to complete an incomplete process for implementing a logical unit reset across a plurality of interfaces, also does not necessitate that the backup controller would have knowledge about which one of the interface(s) is an originator for a given logical unit reset command.

According to examples of the presently disclosed subject matter, further in response to receiving the logical unit reset command from the originator interface 12, the central controller 20 can be configured to issue logical unit reset commands to each of the plurality of interfaces 14A-14N other than the originator interface 12 (block 220).

According to examples of the presently disclosed subject matter, the central controller 20 can have a list of all the active interfaces 10 in the storage system 100, and when a logical unit reset command is received at the central controller 20, it is configured to access the list of active interfaces to determine to which interfaces the logical unit reset command needs to be sent. According to examples of the presently disclosed subject matter, the central controller 20 can use the list of active interfaces to implement the logical unit reset command on each one of the active interfaces. By way of example, for each session for resetting a logical unit (e.g., each row in the table shown in FIG. 3B), the central controller 20 can generate and hold a list of the interfaces which are expected to complete the logical unit reset command. An illustration of the list in a table data structure format is illustrated by way of example by column 332 in FIG. 3B.

By way of example, the central controller 20 can be configured to obtain the list of active interfaces, subtract from this list any interface for which the respective session-data includes an indication that the logical unit reset operation was locally carried out, and send the logical unit reset command to each remaining interface. Thus, in one example, if the logical unit reset command was received at a single originator interface, and no other pending requests for resetting this logical unit exist in the central controller 20, the originator interface 12 (which already performed the logical unit reset operation locally) is removed from the list of interfaces (or is placed in a list of interfaces which completed the logical unit reset), and the central controller 20 will communicate the logical unit reset command to each one of the remaining interfaces 14A-14N. This is the case for example in the bottom row of the table in FIG. 3B, where the logical unit reset operation was completed on the interface I__1, and a completion notification is expected from interface I_1-I_N. The session that is managed by the central controller 20 for logical unit 7 is at a more progressed stage: completion indications have already been received from all the interfaces except for interface I_N.

According to examples of the presently disclosed subject matter, following the communication of the logical unit reset command to the interfaces at block 220, the central controller 20 can be configured to wait for a completion indication from the interfaces 14A-14N. For simplicity, in FIG. 2, it is assumed that each one of the plurality of interfaces 14A-14N returned a completion indication to the central controller, indicating the logical unit reset operation was successfully implemented on each one of the plurality of interfaces 14A-14N (block 225). In further examples of the presently disclosed subject matter, which are described below, the central controller 20 can be configured to deal with non-responding interfaces, or with interfaces which failed to implement the logical unit reset operation locally.

According to examples of the presently disclosed subject matter, following receipt of the completion indication on the central controller 20 from each one of the plurality of interfaces 14A-14N, indicating that each one of the plurality of interfaces 14A-14N successfully implemented the logical unit reset operation locally, the central controller 20 can be adapted to communicate a success response to each one of the plurality of interfaces 14A-14N.

According to examples of the presently disclosed subject matter, when the interfaces 10 receive the success response from the central controller 20, indicating that the process of implementing a logical unit reset command across a plurality of interfaces was completed successfully, each one of the interfaces can determine whether it received the logical unit reset command from the source of the command or from the central controller, or in other words, whether it is the originator interface 12 or one of the other plurality of interfaces 14A-14N. According to examples of the presently disclosed subject matter, and as mentioned above, for each logical unit reset command, each one of the interfaces 10 can hold an indication regarding the source of the command (column 308 in FIG. 3A). Further according to examples of the presently disclosed subject matter, in case a given interface determines that the logical unit reset command for which a completion indication was received is from the central controller 20, the interface can simply ignore or archive this information. Still further according to examples of the presently disclosed subject matter, if however, the interface determines that the logical unit reset command for which a completion indication was received is from the external host 50, which is the initiator of the command, the interface is responsible for issuing a success notification to the initiator. It would be appreciated that in case the central controller 20 is the initiator, a proxy or some other measure can be used to distinguish the commands which are part of the process of implementing a logical unit reset command across a plurality of interfaces, and the command which initiated the process.

In still further examples of the presently disclosed subject matter, when the interfaces 10 receive the success response from the central controller 20, indicating that the process of implementing a logical unit reset command across a plurality of interfaces was completed successfully, each one of the interfaces 10, including the interfaces 14A-14N other than the originator interface 12, can be configured to issue a success notification to the node (or component or entity) from which that interface received the respective logical unit reset command. Thus, when the interface is the originator interface 12, the success notification will be issued back to the initiator, and when the interface is not the originator interface, this response can be sent back to the central controller 20, which in turn can ignore or archive or ignore the success notification, or perform any other operation in connection with this notification.

Figure 4:
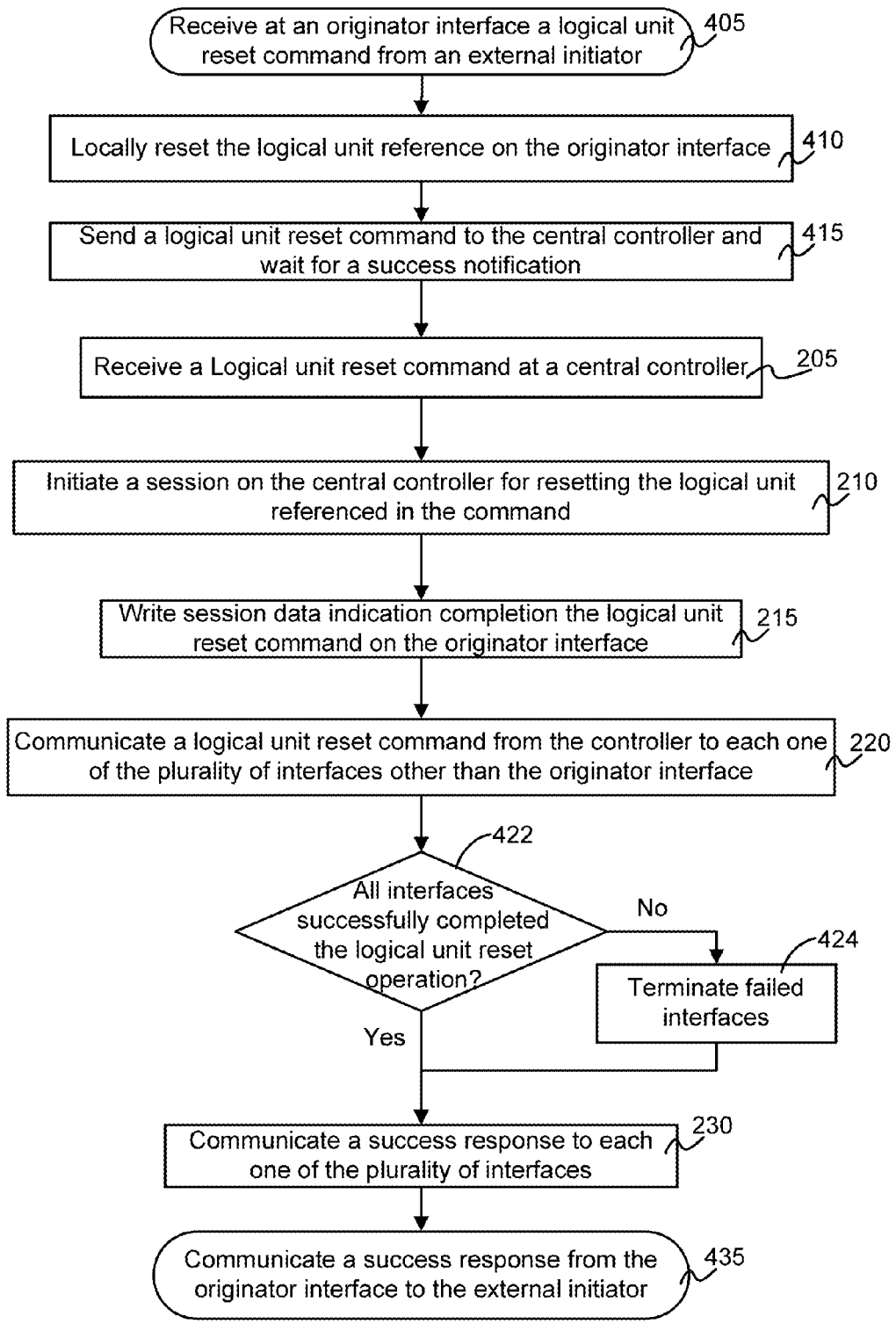
FIG. 4 is a flowchart illustration of the processing of a logical unit reset command in a distributed storage system that includes a plurality of interfaces and shared storage resources, according to examples of the presently disclosed subject matter.

Reference is now made to FIG. 4, which is a flowchart illustration of the processing of a logical unit reset command in a distributed storage system that includes a plurality of interfaces and shared storage resources, according to examples of the presently disclosed subject matter. According to examples of the presently disclosed subject matter, prior to receiving the logical unit reset command at the central controller (block 205), a logical unit reset command from an initiator, in this case an external initiator (say a host 50), can be received at an originator interface 12 (block 405). The originator interface 12 can be responsive to receiving the logical unit reset command for locally resetting the logical unit referenced in the command from the initiator (block 410), and thereafter (or substantially concurrently) the originator interface can send a corresponding logical unit reset command to the central controller 20, and initiate a waiting period (block 415). Blocks 205-220, which are substantially identical to the blocks referenced by same numerals in FIG. 2, and which were described above, can be implemented following block 415.

It would be appreciated that the waiting period is one example of a measure which can be implemented in the storage system 100, and in particular by the originator interface 12 to detect failure of the central controller 20.

According to examples of the presently disclosed subject matter, following the communication of the logical unit reset commands to each of the plurality of interfaces 14A-14N other than the originator interface 12 in block 220, the central controller 20 can wait a certain period of time and at the end of the waiting period, the central controller 20 can determine whether all of the interfaces to which it sent the logical unit reset command in block 220 completed the logical unit reset operation (block 422). For example, the central controller 20 can determine which of the plurality of the interfaces to which it sent the logical unit reset command in block 220 sent back a success notification, indicating that the logical unit reset operation was successfully carried out locally.

According to examples of the presently disclosed subject matter, in case an interface to which the logical unit reset command was sent failed to successfully complete the local logical unit reset operation, the central controller 20 can be configured to regard that interface as a failed interface and terminate it (block 424). It would be appreciated that other failure detection methods can be used to detect interface failure, in addition or as an alternative to the timeout method described above.

According to examples of the presently disclosed subject matter, following receipt of the success notifications, and if necessary the termination of failed interfaces, the central controller 20 can be configured to communicate a success indication to each one of the active interfaces (block 230). The success notification indicates that the logical unit was reset on each of the active interfaces. It would be appreciated that in some examples of the presently disclosed subject matter, the central controller 20 is not aware (and does not hold information regarding) which one of the (active) interfaces is the originator interface, and so the central controller 20 can simply communicate (e.g., broadcast) the success notification to each one of the plurality of interfaces 10.

According to examples of the presently disclosed subject matter, each of the interfaces in receipt of the success indication from the central controller 20 can be adapted to determine what is the source (on this interface) of the logical unit reset command, and the interface can be further adapted to communicate a success notification to the entity (e.g., a node or component) from which the interface received the logical unit reset command. Thus, according to examples of the presently disclosed subject matter, in case the interface received the logical unit reset command from the initiator (e.g., an external host or a proxy) of the logical unit reset command, the interface is configured to communicate a success indication to the initiator (in FIG. 4 it is an external initiator), to indicate that the logical unit reset command from the initiator was successfully implemented in the storage system 100.

Figure 5:
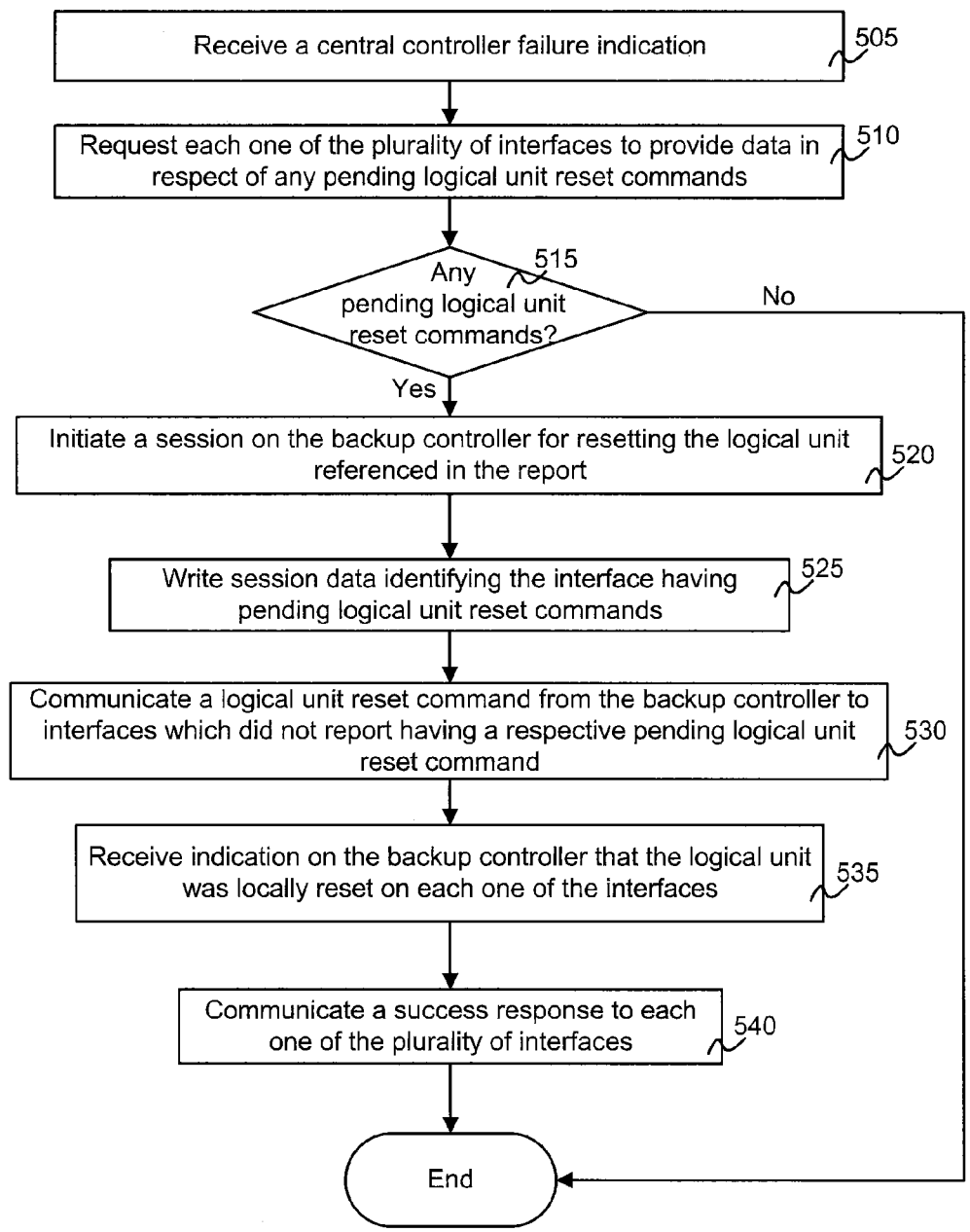
FIG. 5 is a flowchart illustration of a recovery process that can be implemented as part of examples of the presently disclosed subject matter, for recovering from a failure of a central controller.

Reference is now made to FIG. 5, which is a flowchart illustration of a recovery process that can be implemented as part of examples of the presently disclosed subject matter, for recovering from a failure of a central controller. According to examples of the presently disclosed subject matter, in block 505, at some point during the operation of the storage system 100, a failure indication can be received which indicates that the central controller 20 failed (or is failing). According to examples of the presently disclosed subject matter, the source of the central controller's failure notification can be the central controller 20 itself (implementing internal failure detection), or any one of the other components in the system 100. Failure detection methods are well-known and any can be implemented as part of examples of the presently disclosed subject matter.

According to examples of the presently disclosed subject matter, upon receiving the indication that the central controller 20 is failing, a recovery process can be initiated. For example, upon receiving the indication that the central controller 20 is failing, the backup controller 30 can wake up (switch from standby mode to active mode), and begin the recovery process.

According to examples of the presently disclosed subject matter, as part of the recovery process, the backup controller 30 can be configured to request each one of the plurality of (active) interfaces 10 to provide data with respect to any pending logical unit reset commands (block 510). It would be appreciated, that if the list of active interfaces 10 is not available to the backup controller 30, as a preliminary operation, the backup controller 30 can be configured to send a broadcast communication to discover the interfaces 10 and to generate the list of active interfaces.

According to examples of the presently disclosed subject matter, when an interface receives the request from the backup controller 30, the interface can search its logical unit reset session-data table (e.g. the table shown in FIG. 3A) for pending logical unit reset sessions. According to examples of the presently disclosed subject matter, on a given interface, pending logical unit reset sessions can include logical unit reset sessions in which the interface serves as the originator interface, and is awaiting the success notification from the central controller 20 for issuing a success indication to the initiator of the logical unit reset command, and it can include logical unit reset sessions which were communicated to the interface from the central controller 20 before it failed (and where the interface is not the originator interface), and are still waiting for a completion notification.

According to examples of the presently disclosed subject matter, following the request for data with respect to any pending logical unit reset commands, the backup controller can be configured to determine whether there are any pending logical unit reset commands (block 515). For example, if any one of the plurality of active interfaces 10 responded in block 510, the backup controller may progress to block 520, otherwise the recovery process ends, as there are no pending logical reset commands in the storage system for which a recovery process needs to be implemented.

According to examples of the presently disclosed subject matter, if it is determined at block 515 that there is a pending logical unit reset command, the backup controller 30 can be configured to initiate a session implementing a logical unit reset across the plurality of interfaces, according to the data in the response from the interface which reported the pending logical unit reset command (block 520).

According to examples of the presently disclosed subject matter, as part of the initiation of the session for implementing the logical unit reset across the plurality of interfaces, the backup controller 30 can be configured to create and hold in memory a table that is similar to the table shown in FIG. 3B. In this table, the interfaces which reported the pending logical unit reset command can be recorded as waiting for completion notification (block 525) (possibly for each logical unit a plurality of such interfaces can exist).

For example, with reference to the table shown in FIG. 3B, in response to the query from the backup controller 30, interfaces I_1-I_N−1 would report a pending logical unit reset command with respect to the logical unit reference "7". For example, the interface I_N has not yet returned a success indication in response to the logical unit reset command from the central controller 20. In response to the report from the interfaces I_1-I_N−1 regarding logical unit 7 (or in response to the first report which was received at the backup controller 30) an entry is added to the logical unit reset command in the backup controller 30. This table can be based on the table shown in FIG. 3B. Based on this table, the backup controller 30 can complete the implementation of the logical unit reset command across the plurality of interfaces 10. When the implementation of a logical unit reset command across the plurality of interfaces 10 is completed, the backup controller 30 can issue the success indication and each interface receiving the success indication can be configured to issue a success notification to the entity from which the interface received the logical unit reset command. As mentioned above, in this manner, the originator interface is adapted to provide the initiator with an acknowledgement (or a success notification) of completion of the logical unit reset operation.

According to examples of the presently disclosed subject matter, as mentioned above, the backup controller 30 is responsive to an interface reporting a pending logical unit reset command thereon for starting a session for implementing the logical unit reset command across the plurality of interfaces of the storage system 100. Further by way of example, the backup controller 30 can then use the active interfaces information (which is obtained by the backup controller as part of the recovery process) to determine if there are any active interfaces which did not report having a respective pending logical unit reset command (for the same logical unit), and in case there are such active interfaces, the backup controller 30 can be configured to communicate a corresponding logical unit reset command to each one of these active interfaces (the ones which did not report having a respective pending logical unit reset command) (block 530).

According to examples of the presently disclosed subject matter, the backup controller 30 can be configured to receive indications from the interfaces 10, which indicate that the logical unit was locally reset on each one of the interfaces 10 (block 535). The backup controller 30 can be configured to implement blocks 422 and 424, to eliminate from the list of active interfaces any interface which did not respond (e.g., within a certain period of time) to the logical unit reset command from the backup controller 30, or which failed to reset the logical unit locally.

According to examples of the presently disclosed subject matter, once success indications are received from all of the (active) interfaces 10, the backup controller 30 can be adapted to communicate a success notification to each one of the interfaces 10 to indicate that the logical unit reset command was successfully implemented throughout the storage system 100 (block 540).

Figure 6A:
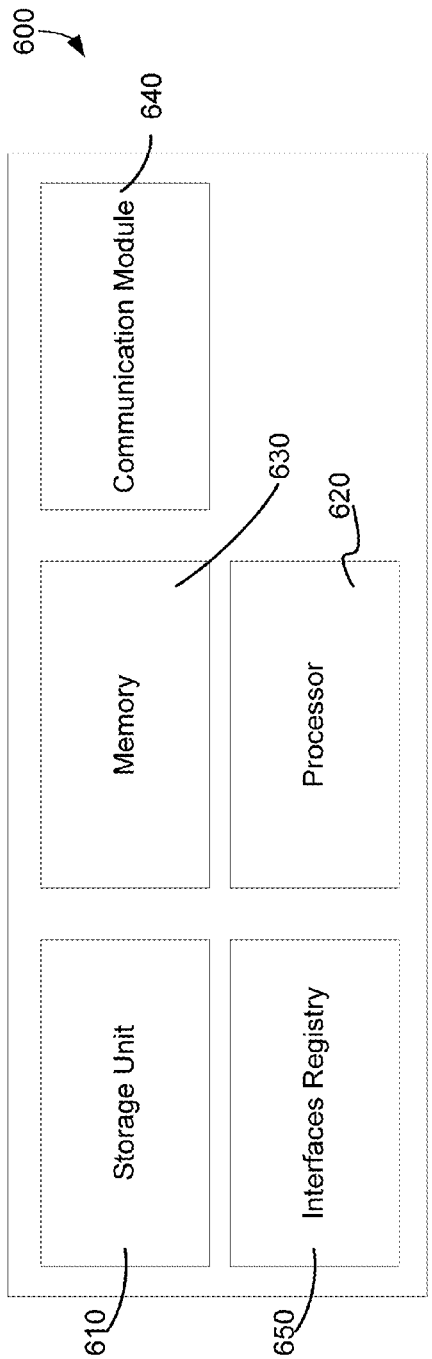
FIG. 6A is a block diagram illustration of a central controller according to examples of the presently disclosed subject matter.

Reference is now made to FIG. 6A, which is a block diagram illustration of a central controller according to examples of the presently disclosed subject matter.

It would be appreciated that the backup controller can have a similar configuration and can include similar components as the central controller, but according to examples of the presently disclosed subject matter, it can be kept in standby mode while the central controller is functioning properly and is only switched to active mode when the central controller failed (or is failing) and a recovery process is initiated. In other examples of the presently disclosed subject matter, while the backup controller is in standby mode, it can monitor the central controller and/or it can communicate with or monitor other components of the storage system to receive or to detect indications of a possible failure (or an impending failure) of the central controller.

Reference is now made to FIG. 6A, which is a block diagram illustration of a central controller, according to examples of the presently disclosed subject matter. According to examples of the presently disclosed subject matter the central controller 600 can include a storage unit 610 in which a set of computer readable instructions can be stored, including instructions for carrying out the process blocks involving the central controller illustrated in FIGS. 2, 4 and/or 5 or as described above including with reference to FIGS. 2, 4 and/or 5. The central controller 600 can also include a processor 620 and a memory 630. The memory 630 and processor 620 can operate cooperatively to process data from the storage unit 610 or from external sources, and to provide any output of the central controller 600, according to any processing or output operation of the central controller 600 shown at least in FIGS. 2, 4 and/or 5, or as described above, including with reference to FIGS. 2, 4 and/or 5.

According to examples of the presently disclosed subject matter, the central controller 600 can include a communication module 640. The communication module 640 can be configured to enable to central controller 600 to communicate with any or with each of the interfaces 10, the backup controller 30 and/or the storage hardware which provide the physical storage resources 40. According to examples of the presently disclosed subject matter, the communication module 640 can also enable the central controller 600 to communicate directly with the hosts 50 (or with any other external entity) and with a proxy (not shown) that can be used, for example, for addressing logical unit reset commands from the central controller 600 to the interfaces.

Still further by way of example, the central controller 600 can include an interfaces registry 650 where the active or valid interfaces 10 of the storage system 100 can be registered. According to examples of the presently disclosed subject matter, the processor 620 can add and remove interfaces from the registry, for example, when a new interface is detected (or registers with the central controller 600), or when an interface is terminated.

According to examples of the presently disclosed subject matter, the central controller 600 can be configured to hold in its memory 630 the data in the table shown in FIG. 3B. It would be appreciated that the data can be organized in other ways, such as in a list, for example.

According to examples of the presently disclosed subject matter, the processor 620 can be responsive to receiving a logical unit reset command from an interface for determining whether there is already an active logical unit reset session for the logical unit referenced in the command. If there is already an active session, the processor can add the command to the active session and mark that the local logical unit reset operation was locally completed on the interface from which the logical unit reset command was received. If there is no active session for the logical unit referenced in the logical unit reset command, a session is initiated, and the logical unit reset is implemented in the storage system, for example in accordance with the process illustrated in FIGS. 2 and/or 4, or as described above, including with reference to FIGS. 2, and/or 4.

According to examples of the presently disclosed subject matter, upon initiation of a session for implementing a logical unit reset in the storage system, the processor 620 can be configured to access the interfaces registry 650 to determine to which interfaces a logical unit reset command needs to be sent. According to further examples of the presently disclosed subject matter, the processor 620 is adapted to monitor the operation of the interfaces, and in case it is determined that an interface is not operating properly (or is inoperable), the processor 620 can be configured to remove that interface from the interfaces registry 650 or to mark it in the interfaces registry 650 as inactive or inoperable.

According to examples of the presently disclosed subject matter, when the processor 620 determines that a logical unit reset operation was successfully implemented on all active interfaces, the processor 620 can be configured to communicate a success indication to each one of the plurality of active interfaces.

As mentioned above, the backup controller can have a similar structure as the central controller 600 with substantially identical functional components. According to examples of the presently disclosed subject matter, the processor of the backup controller can be responsive to an indication that the central controller failed (or is failing) to initiate the recovery process, for example in accordance with the process illustrated in FIG. 5, or as described above, including with reference to FIG. 5.

According to examples of the presently disclosed subject matter, the processing unit of the backup controller can be configured to monitor the operation of the central controller 600, to identify a possibility of a failure thereof. In other examples of the presently disclosed subject matter, the indication with regard to a failure of the central controller 600 can be received at the backup controller from other components of the storage system, including the interfaces for example.

Figure 6B:
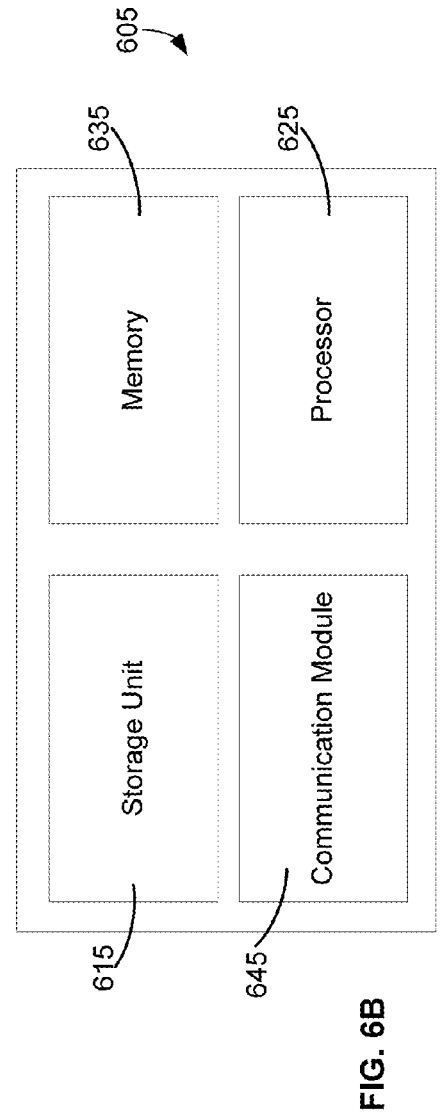
FIG. 6B is a block diagram illustration of one of the plurality of interfaces in the storage system, according to examples of the presently disclosed subject matter.

Turning now to FIG. 6B, there is shown a block diagram illustration of one of the plurality of interfaces in the storage system, according to examples of the presently disclosed subject matter. For illustration purposes, the interface 605 shown in FIG. 6B is described with the functionality of an originator interface supporting at least the process in FIG. 4 or as described above, including with reference to FIG. 4. It would be appreciated that when the interface is one of the plurality of other interfaces which are addressed by the central controller, only part of the functionality of the originator interface is necessary, albeit the capabilities and the structure of each of the interfaces can support such additional functionality in case it is required to operate as an originator interface in subsequent logical unit resent commands.

According to examples of the presently disclosed subject matter the originator interface 605 can include a storage unit 615 in which a set of computer readable instructions can be stored, including instructions for carrying out the process blocks involving the originator interface at least as shown in FIG. 4 and described with reference thereto above. The storage unit 615 can also include instructions for carrying out the process blocks involving the interfaces other than the originator interface at least as shown in FIGS. 2-5 and described above.

The originator interface 605 can also include a processor 625, a memory 635 and communication module 645. The processor 625 can process incoming logical unit reset command, and can write data about the logical unit reset command to the memory 635. For example, the processor 625 can write and the memory 635 can hold the data in a table similar to the one shown in FIG. 3A. Thus for example, if the source of the logical unit reset command is an initiator (external or internal), the processor 625 can be configured to indicate this in the record for this logical unit reset command. This data can be used by the processor 625 when the process of implementing the logical unit reset in the storage system is complete to issue an indication to the initiator that the logical unit reset command was successfully processed.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A method of implementing a logical unit reset across a plurality of interfaces in a distributed storage system, comprising:
in response to receiving at a central controller a logical unit reset command from an originator interface, initiating on the central controller a session for implementing the logical unit reset across the plurality of interfaces, and writing session-data including an indication that the originator interface implemented the respective logical unit reset locally;
communicating the logical unit reset command from the central controller to each interface other than the originator interface;
updating the session-data in response to receiving an indication from an interface that the logical unit was successfully reset locally;
when each one of the plurality of interfaces implemented the logical unit reset locally, communicating from the central controller a success response to each one of the plurality of interfaces;
in response to receiving a central controller failure indication, requesting each one of the plurality of interfaces to provide data in respect of pending logical unit reset commands;
in response to receiving a pending logical unit reset command response from an interface, initiating on a backup controller a session for implementing the logical unit reset across the plurality of interfaces;
writing session-data including an indication that interfaces which reported having a pending logical unit reset command implemented the respective logical unit reset locally;
communicating a logical unit reset command from the backup controller to each one of the plurality of interfaces which did not report having a pending logical unit reset command in respect of the logical unit; and
in response to receiving a success response from each one of the plurality of interfaces indicating that the logical unit was locally reset, communicating from the backup controller a success response to each one of the plurality of interfaces.

2. The method according to claim 1, further comprising: in response to receiving at an originator interface a logical unit reset command from an external initiator, locally resetting the logical unit on the originator interface and communicating the logical unit reset command to the central controller.

3. The method according to claim 2, further comprising: in response to receiving at the originator interface the success response from the central controller, communicating the success response from the originator interface to the external initiator.

4. The method according to claim 1, wherein in case the logical unit reset command is received at the central controller while the central controller has an active session for implementing resetting of the same logical unit as the one referenced in the command, updating the active session with an indication that that the originator interface implemented the respective logical unit reset locally.

5. The method according to claim 4, wherein in response to receiving the success response from the central controller at each one of a plurality of originator interfaces, communicating the success response from the respective originator interface to an external initiator from which the logical unit reset command was received at the originator interface.

6. A distributed storage system, comprising:
a plurality of interfaces, including an originator interface which received a logical unit reset command from an initiator;
a hardware central controller responsive to receiving a logical unit reset command from the originator interface for:
initiating a session for implementing the logical unit reset across the plurality of interfaces,
writing session-data including an indication that the originator interface implemented the respective logical unit reset locally, and
communicating the logical unit reset command to each interface other than the originator interface;
said hardware central controller is configured to update the session-data in response to receiving an indication from an interface that the logical unit was successfully reset locally; and
when each one of the plurality of interfaces successfully implemented the logical unit reset locally, said hardware central controller is configured to communicate a success response to each one of the plurality of interfaces;
wherein the system further comprising a hardware backup controller which is responsive to receiving an indication that the hardware central controller failed, requesting each one of the plurality of interfaces to provide data in respect of pending logical unit reset commands;
said hardware backup controller is responsive to receiving a pending logical unit reset response from an interface for:
initiating a session for implementing the logical unit reset across the plurality of interfaces;
writing session-data including an indication that interfaces which reported having a pending logical unit reset implemented the respective logical unit reset locally;
communicating a logical unit reset command from the hardware backup controller to each one of the plurality of interfaces which did not report having a pending logical unit reset command in respect of the logical unit; and in response to receiving a success response from each one of the plurality of interfaces indicating that the logical unit was locally reset, the hardware backup controller is configured to communicate a success response to each one of the plurality of interfaces.

7. The system according to claim 6, wherein the originator interface is responsive to receiving the logical unit reset command from an external initiator for locally resetting the logical unit on the originator interface and communicating the logical unit reset command to the central controller.

8. The system according to claim 7, wherein said originator interface is responsive to receiving the success response from the central controller for communicating the success response to the external initiator.

9. The system according to claim 6, wherein the central controller is configured to maintain a list of active interface services, and is further configured to remove an interface from the list in case the interface is not responsive to the logical unit reset command from the central controller.

10. The system according to claim 6, wherein in case the logical unit reset command is received at the central controller while the central controller has an active session for implementing resetting of the same logical unit as the one referenced in the command, the central controller is configured to update the active session with an indication that the originator interface implemented the respective logical unit reset locally.

11. The system according to claim 10, wherein the session-data identifies a plurality of originator interfaces, wherein each one of the plurality of originator interfaces is associated with a different logical unit reset command that relates to the same logical unit.

12. The system according to claim 11, wherein in response to receiving the success response from the central controller at each one of the plurality of originator interfaces, each one of the originator interfaces is configured to communicate the success response to an external initiator from which the logical unit reset command was received at the originator interface.

13. A hardware central controller of a distributed storage system that is configured to enable implementing a logical unit reset across a plurality of interfaces in the distributed storage system, comprising:
    a hardware processor responsive to receiving a logical unit reset command from an originator interface for:
        initiating a session for implementing the logical unit reset across the plurality of interfaces,
        writing session-data including an indication that the originator interface implemented the respective logical unit reset locally, and
    a communication module that is configured to communicate the logical unit reset command to each interface other than the originator interface;
    said hardware processor is configured to update the session-data in response to receiving an indication from an interface that the logical unit was successfully reset locally;
    when each one of the plurality of interfaces successfully implemented the logical unit reset locally, said hardware processor is configured to issue a success response to each one of the plurality of interfaces;
    wherein the hardware central controller is operatively connected to a hardware backup controller which is responsive to receiving an indication that the hardware central controller failed, requesting each one of the plurality of interfaces to provide data in respect of pending logical unit reset commands;
    said hardware backup controller is responsive to receiving a pending logical unit reset response from an interface for:
        initiating a session for implementing the logical unit reset across the plurality of interfaces;
        writing session-data including an indication that interfaces which reported having a pending logical unit reset implemented the respective logical unit reset locally;
        communicating a logical unit reset command from the hardware backup controller to each one of the plurality of interfaces which did not report having a pending logical unit reset command in respect of the logical unit; and
    in response to receiving a success response from each one of the plurality of interfaces indicating that the logical unit was locally reset, the hardware backup controller is configured to communicate a success response to each one of the plurality of interfaces.

14. A non-transitory program storage device readable by machine, tangibly embodying a program of instructions executable by the machine to perform a method of implementing a logical unit reset across a plurality of interfaces in a distributed storage system, comprising:
    in response to receiving at a central controller a logical unit reset command from an originator interface, initiating a session for implementing the logical unit reset across the plurality of interfaces, and writing session-data including an indication that the originator interface implemented the respective logical unit reset locally;
    communicating the logical unit reset command from the central controller to each interface other than the originator interface;
    updating the session-data in response to receiving an indication from an interface that the logical unit was successfully reset locally; and
    when each one of the plurality of interfaces implemented the logical unit reset locally, communicating from the central controller a success response to each one of the plurality of interfaces;
    in response to receiving a central controller failure indication, requesting each one of the plurality of interfaces to provide data in respect of pending logical unit reset commands;
    in response to receiving a pending logical unit reset command response from an interface, initiating on a backup controller a session for implementing the logical unit reset across the plurality of interfaces;
    writing session-data including an indication that interfaces which reported having a pending logical unit reset command implemented the respective logical unit reset locally;
    communicating a logical unit reset command from the backup controller to each one of the plurality of interfaces which did not report having a pending logical unit reset command in respect of the logical unit; and
    in response to receiving a success response from each one of the plurality of interfaces indicating that the logical unit was locally reset, communicating from the backup controller a success response to each one of the plurality of interfaces.

15. A computer program product comprising a non-transitory computer useable storage medium having computer readable program code embodied therein of implementing a logical unit reset across a plurality of interfaces in a distributed storage system, the computer program product comprising:

computer readable program code responsive to receipt at a central controller a logical unit reset command from an originator interface for causing a computer to initiate a session for implementing the logical unit reset across the plurality of interfaces, and for causing the computer to write session-data including an indication that the originator interface implemented the respective logical unit reset locally;

computer readable program code for causing the computer to communicate the logical unit reset command from the central controller to each interface other than the originator interface;

computer readable program code for causing the computer to update the session-data in response to receiving an indication from an interface that the logical unit was successfully reset locally; and computer readable program code for causing the computer to communicate a success response to each one of the plurality of interfaces when each one of the plurality of interfaces implemented the logical unit reset locally;

computer readable program code for causing the computer to request each one of the plurality of interfaces to provide data in respect of pending logical unit reset commands, in response to receiving a central controller failure indication;

computer readable program code for causing the computer to initiate on a backup controller a session for implementing the logical unit reset across the plurality of interfaces, in response to receiving a pending logical unit reset command response from an interface;

computer readable program code for causing the computer to write session-data including an indication that interfaces which reported having a pending logical unit reset command implemented the respective logical unit reset locally;

computer readable program code for causing the computer to communicate a logical unit reset command from the backup controller to each one of the plurality of interfaces which did not report having a pending logical unit reset command in respect of the logical unit; and computer readable program code for causing the computer to communicate from the backup controller a success response to each one of the plurality of interfaces, in response to receiving a success response from each one of the plurality of interfaces indicating that the logical unit was locally reset.

16. A method of implementing a logical unit reset across a plurality of interfaces in a distributed storage system, comprising:

in response to receiving at a central controller a logical unit reset command from an originator interface, initiating on the central controller a session for implementing the logical unit reset across the plurality of interfaces, and writing session-data including an indication that the originator interface implemented the respective logical unit reset locally;

communicating the logical unit reset command from the central controller to each interface other than the originator interface;

updating the session-data in response to receiving an indication from an interface that the logical unit was successfully reset locally;

when each one of the plurality of interfaces implemented the logical unit reset locally, communicating from the central controller a success response to each one of the plurality of interfaces; and in case an interface from among the plurality of interfaces is not responsive to the logical unit reset command from the central controller, removing it from a list of active interfaces.

17. A distributed storage system, comprising:

a plurality of interfaces, including an originator interface which received a logical unit reset command from an initiator; a hardware central controller responsive to receiving a logical unit reset command from the originator interface for:

initiating a session for implementing the logical unit reset across the plurality of interfaces, writing session-data including an indication that the originator interface implemented the respective logical unit reset locally, and communicating the logical unit reset command to each interface other than the originator interface;

said hardware central controller is configured to update the session-data in response to receiving an indication from an interface that the logical unit was successfully reset locally; and when each one of the plurality of interfaces successfully implemented the logical unit reset locally, said hardware central controller is configured to communicate a success response to each one of the plurality of interfaces;

wherein the hardware central controller is configured to maintain a list of active interface services, and is further configured to remove an interface from the list in case the interface is not responsive to the logical unit reset command from the hardware central controller.

18. A hardware central controller of a distributed storage system that is configured to enable implementing a logical unit reset across a plurality of interfaces in the distributed storage system, comprising:

a hardware processor responsive to receiving a logical unit reset command from an originator interface for:

initiating a session for implementing the logical unit reset across the plurality of interfaces, writing session-data including an indication that the originator interface implemented the respective logical unit reset locally, and a communication module that is configured to communicate the logical unit reset command to each interface other than the originator interface;

said hardware processor is configured to update the session-data in response to receiving an indication from an interface that the logical unit was successfully reset locally; and when each one of the plurality of interfaces successfully implemented the logical unit reset locally, said hardware processor is configured to issue a success response to each one of the plurality of interfaces;

wherein hardware central controller is configured to maintain a list of active interface services, and is further configured to remove an interface from the list in case the interface is not responsive to the logical unit reset command from the hardware central controller.

19. A non-transitory program storage device readable by machine, tangibly embodying a program of instructions executable by the machine to perform a method of implementing a logical unit reset across a plurality of interfaces in a distributed storage system, comprising:

in response to receiving at a central controller a logical unit reset command from an originator interface, initiating a session for implementing the logical unit reset across the plurality of interfaces, and writing session-data including an indication that the originator interface implemented the respective logical unit reset locally;

communicating the logical unit reset command from the central controller to each interface other than the originator interface;

updating the session-data in response to receiving an indication from an interface that the logical unit was successfully reset locally; and when each one of the plurality of interfaces implemented the logical unit reset locally, communicating from the central controller a success response to each one of the plurality of interfaces; and in case an interface from among the plurality of interfaces is not responsive to the logical unit reset command from the central controller, removing it from a list of active interfaces.

20. A computer program product comprising a non-transitory computer useable storage medium having computer readable program code embodied therein of implementing a logical unit reset across a plurality of interfaces in a distributed storage system, the computer program product comprising:

computer readable program code responsive to receipt at a central controller a logical unit reset command from an originator interface for causing a computer to initiate a session for implementing the logical unit reset across the plurality of interfaces, and for causing the computer to write session-data including an indication that the originator interface implemented the respective logical unit reset locally;

computer readable program code for causing the computer to communicate the logical unit reset command from the central controller to each interface other than the originator interface;

computer readable program code for causing the computer to update the session-data in response to receiving an indication from an interface that the logical unit was successfully reset locally; and computer readable program code for causing the computer to communicate a success response to each one of the plurality of interfaces when each one of the plurality of interfaces implemented the logical unit reset locally;

computer readable program code for causing the computer to remove a given interface from among the plurality of interfaces from a list of active interfaces, in case the given interface is not responsive to the logical unit reset command from the central controller.

* * * * *